UNITED STATES PATENT OFFICE.

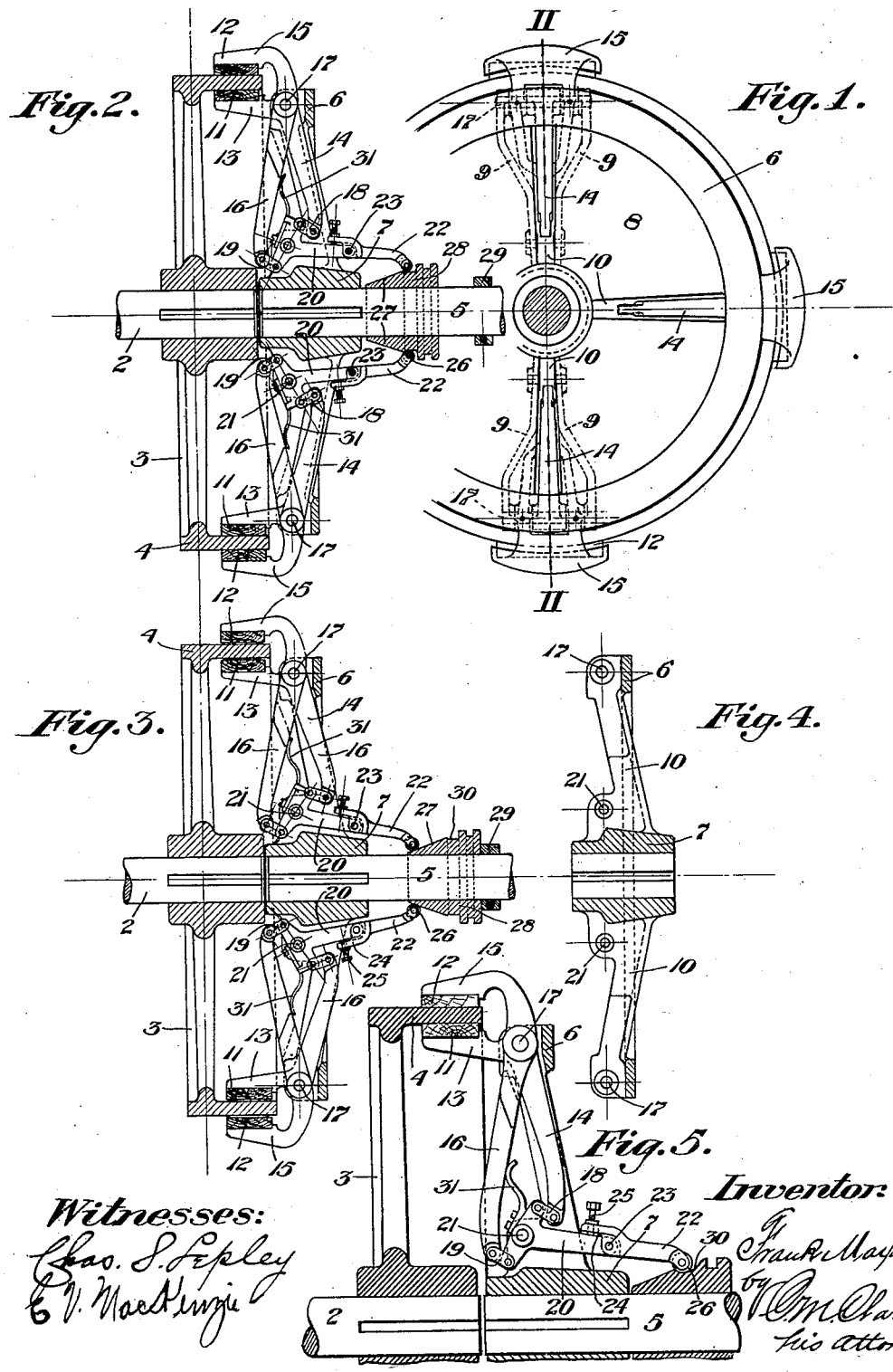

FRANK MAXANT, OF ALLEGHENY, PENNSYLVANIA.

FRICTION-CLUTCH.

No. 885,938.     Specification of Letters Patent.     Patented April 28, 1908.

Application filed April 25, 1907. Serial No. 370,159.

*To all whom it may concern:*

Be it known that I, FRANK MAXANT, a citizen of the United States, residing at Allegheny, in the county of Allegheny and State of Pennsylvania, have invented certain new and useful Improvements in Friction-Clutches, of which the following is a specification, reference being had therein to the accompanying drawing.

My invention refers to improvements in friction clutches and has for its object to provide means for imparting motion from a constantly running shaft gradually to a relatively stationary shaft, by the means herein-after more fully described.

Referring to the drawings; Figure 1 is a partial elevation of the apparatus assembled, looking from the back of the friction clutches toward the driving shaft. Fig. 2 is a vertical sectional view on the line II. II. of Fig. 1, showing the clutches connected for operation. Fig. 3 is a similar sectional view showing the clutches released. Fig. 4 is a vertical sectional view through the supporting frame for the clutch levers. Fig. 5 is an enlarged sectional detail view of a portion of the apparatus, similar to Fig. 2.

In the drawings, 2 represents the engine or driving shaft, normally in constant rotation and provided with the pulley 3 having the frictional coupling flange 4, said pulley being keyed or otherwise secured upon shaft 2.

5 represents the shaft to which motion is desired to be imparted, upon which is secured the circular frame 6 annularly disposed around the hub 7, and connected therewith by arms or web sections 8. Said frame 6 is provided with adjacent radially disposed flange members 9, 9, forming the boundaries of the webs 8 or of equivalent connecting arms. Flanges 9 define the intervening space 10 in which are located the several levers forming portions of the frictional clamping members. Said frictional clamping members comprise shoes 11, 12, respectively of wood or other material so located in their carrying arms that they will be brought simultaneously into gripping contact with the inner and outer sides of flange 4 for the purpose of coupling said flange with the gripping levers, imparting resulting rotary motion through frame 6 to the driven shaft 5.

The inner shoes 11 are mounted in terminal jaws 13 of levers 14, while the outer shoes 12 are likewise mounted in shoes 15 of similar levers 16, both of said levers 14 and 16 being pivotally mounted at 17 upon a cross shaft carried by the flanges 9 of the lever frame. As shown lever 14 passes between the bifurcated middle portion of lever 16, sufficient clearance being provided between the flanges 9 of the rotary frame to receive both levers. The inner ends of levers 14 and 16 are connected by short links 18 and 19 respectively with the oppositely disposed terminals of an actuating lever 20, pivoted at 21 between the said flanges 9 upon a suitable pin or shaft mounted in bearings therein. Said lever 20 extends backwardly as shown, being provided with a supplemental terminal extension 22, pivoted to lever 20 at 23. Said extension 22 is provided with a forwardly extending arm 24 carrying a temper screw 25 adapted to be set inwardly against lever 20 so as to adjust the inclination of terminal 22, thereby compensating for wear and providing means for accurately controlling the amount of gripping action of the shoes. Lever extensions 22 are likewise provided at their rear terminals with bearing rollers 26 mounted between the frame terminals of said extension, and adapted to be engaged by the inclined face 27 of a longitudinally shifting cone 28. Said cone is adjusted longitudinally on shaft 5 by suitable lever mechanism, being retained against undue backward movement by collar 29, and it will thus be seen that as the cone is set forward between rollers 26 gripping action in both directions will be imparted to levers 14 and 16 accomplishing the purpose desired.

By reason of the proportions of the various levers the power exerted by the cone is greatly multiplied so as to insure a very great gripping action by the shoes, while the relative travel at the cone and shoe position respectively is such as to permit of very gradual application of the frictional clutches.

In previous constructions of this character no means has been provided for automatic locking of the levers and their actuating means to maintain the gripping action until relieved. For such purpose I have provided cone 28 with an annular recess or groove 30 immediately back of the highest point of the cone, into which the rollers 26 will be inserted, and by which they will be positively held until forcibly disengaged by retracting the cone. The construction of this feature of the invention is more clearly illustrated in Fig. 5, showing the cone and its annular recess 30 engaging underneath the rollers.

For the purpose of positively separating the levers and facilitating the uncoupling operation, I have provided springs 31 secured upon the outer face of lever 20 and bearing against the inner side of lever 16, tending to separate the levers 14 and 16 and their shoes and to throw the inner end of terminal 22 inwardly toward shaft 5, when the cone is retracted. By this means all tendency to sticking of the shoes is overcome, and their prompt disengagement facilitated.

It will be understood that the levers may be variously arranged as to number or location around the carrying frame 6 and its parts; also that different changes or modification may be made by the skilled mechanic in the design, proportions, arrangement or other details, but all such changes are to be considered as within the scope of the following claims:

What I claim is:

1. In a friction clutch, the combination with a driving shaft and a flanged pulley thereon, of a driven shaft provided with a circular carrying frame, pairs of levers pivotally mounted for operation in said frame and provided with gripping shoes engaging the inner and outer sides of the flange of the driving pulley, a pivotally mounted actuating lever having integral oppositely disposed arms connected by links to the terminals of said levers and provided with a backwardly extending arm having a bearing roller, and an actuating cone slidingly mounted on the driven shaft and arranged to engage said roller, substantially as set forth.

2. In a friction clutch, the combination with a driving shaft and a flanged pulley thereon, of a driven shaft provided with a circular carrying frame, pairs of levers pivotally mounted for operation in said frame and provided with gripping shoes engaging the inner and outer sides of the flange of the driving pulley, a pivotally mounted actuating lever having integral oppositely disposed arms connected by links to the terminals of said levers and provided with a backwardly extending arm, an actuating cone slidingly mounted on the driven shaft, and a spring secured to the actuating lever and bearing against one of the gripping levers, substantially as set forth.

3. In a friction clutch, the combination with a driving element having a portion for frictional engagement, of a shaft carrying a driven element having a frame, opening and closing levers mounted in said frame, and provided with gripping shoes adapted to grip the opposite sides of said frictional engagement portion, a pivotally mounted actuating lever having integral oppositely disposed arms connected by links to the terminals of said levers and provided with a backwardly extending arm having a pivoted adjustable bearing terminal provided with a roller, a separating spring secured to the actuating lever and bearing against one of the gripping levers, and an actuating cone slidingly mounted on the shaft of the driven element, substantially as set forth.

4. In a friction clutch, the combination with a driving element having a portion for frictional engagement, of a shaft carrying a driven element having a frame, opening and closing levers mounted in said frame and provided with gripping shoes adapted to grip the opposite sides of said frictional engagement portion, a pivotally mounted actuating lever having integral oppositely disposed arms connected by links to the terminals of said levers and provided with a backwardly extending arm having a pivoted adjustable bearing terminal provided with a roller, and an actuating cone slidingly mounted on the shaft of the driven element and provided with an annular recess adapted to engage the roller of the bearing terminal, substantially as set forth.

5. In a friction clutch, the combination with a driving shaft and a flanged pulley thereon, of a driven shaft provided with a circular carrying frame, oppositely located pairs of opening and closing levers provided with gripping shoes and pivotally mounted for operation in said frame, a pivotally mounted actuating lever for each of said pairs having integral oppositely disposed arms connected by links to the terminals of said levers and provided with a backwardly extending arm having a pivoted adjustable bearing terminal with a roller extremity, and an actuating cone slidingly mounted on the driven shaft and provided with an annular recess adapted to engage the rollers of said terminals, substantially as set forth.

6. In a friction clutch, the combination with a driving shaft and a flanged pulley thereon, of a driven shaft provided with a circular carrying frame, oppositely located pairs of opening and closing levers provided with gripping shoes and pivotally mounted for operation in said frame, a pivotally mounted actuating lever for each of said pairs having integral oppositely disposed arms connected by links to the terminals of said levers and provided with a backwardly extending arm having a pivoted adjustable bearing terminal with a roller extremity, and an actuating cone slidingly mounted on the driven shaft and provided with an annular recess adapted to engage the rollers of said terminals, with spring mechanism for separating the arms of the gripping levers, substantially as set forth.

7. In a friction clutch, the combination of a driving element having a peripheral portion for frictional engagement, of a driven element having a correspondingly arranged frame, oppositely located pairs of opening and closing levers provided with gripping shoes mounted in said frame upon common bearings, actuating levers therefor having pivotal bearings and oppositely disposed arms connected by links in the ends of said levers, said actuating levers having pivotally mounted adjustable terminals having bearing rollers, springs for separating the first named levers, and an adjustable coniform cam slidingly mounted for engagement with said terminals, provided with a recessed groove immediately behind its apex for receiving and holding said terminals, substantially as set forth.

In testimony whereof I affix my signature in presence of two witnesses.

FRANK MAXANT.

Witnesses:
J. L. TREFALLER, Jr.,
C. M. CLARKE.